Figure 1:
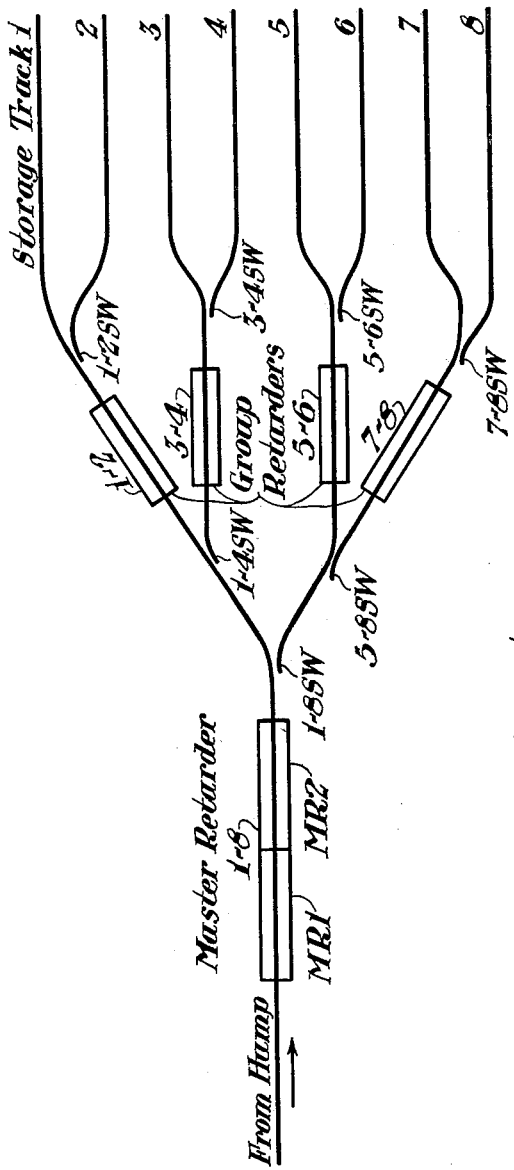

INVENTOR.
Sih Hsuin Tsiang
BY W. L. Stout
HIS ATTORNEY

United States Patent Office 3,128,976
Patented Apr. 14, 1964

3,128,976
INFORMATION TRANSFER IN AUTOMATIC
RAILROAD CLASSIFICATION YARDS
Sih Hsuin Tsiang, Morristown, N.J., assignor to Westinghouse Air Brake Company, Wilmerding, Pa., a corporation of Pennsylvania
Filed Apr. 14, 1958, Ser. No. 728,159
3 Claims. (Cl. 246—182)

My invention relates to the transfer of control information in railroad classification yards provided with automatic speed control and switching systems. More particularly, my invention pertains to the transfer of speed information registered at one location to a second location in the yard in order to properly control speed of cuts of cars moving through the yard to the various storage tracks.

Both switch and speed control systems for railroad classification yards are known in the general art. The existing speed control systems are of the semi-automatic and also of the fully automatic type. One such system of the automatic type is shown in the copending application for Letters Patent of the United States Serial No. 676,730, filed August 7, 1957 by David P. Fitzsimmons and William A. Robison, Jr., for an Automatic Control System for Railway Classification Yards, this reference application having the same assignee as the present application. This copending application shows in some detail the system of my invention, but does not in any manner claim this invention. In the prior systems, various items of information are transferred from one location to a following location in the yard to provide elements and functions necessary for speed control and for the control of the track switches. One particular item of information necessary for the Fitzsimmons and Robison system is whether or not the actual measured speed of a particular cut of cars as it leaves the master retarded matches the value selected by the retarder control system as the correct leaving speed from the master retarder for that cut of cars. In the system of this copending application, the selected leaving speed for a cut of cars out of the master retarder is used elsewhere in the system as one basis in the calculation of the rolling resistance for that cut over the portions of the route which are of curved track. Specifically, the master retarder leaving speed for a particular cut serves as a base from which the change in speed at a lower point in the yard is determined in order that the acceleration or deceleration of that cut may be calculated and transformed into a rolling resistance factor. It is obvious that, if the chosen leaving speed from the master retarder is not attained prior to that particular cut clearing the retarder, the curved track rolling resistance factor ($R_c$) as calculated will not be correct. Under such conditions, an average value of the factor $R_c$ based on the performance of other cuts of cars and/or the weather and the season of the year is used in place of a calculated value. Thus, a selection between the average $R_c$ and the calculated $R_c$ is made on the basis of whether or not the leaving velocity of the particular cut in question out of the master retarder was correct as selected. In other words, this selection is based on the correct leaving velocity answer or information which is transferred from the master retarder to the following location.

It is also obvious to those familiar with classification yard operation that long cuts of cars passing through the master retarder are controlled over their entire length by the braking action of the retarder to reduce the speed. Thus, the correct leaving velocity as selected for that cut may not be attained until the final portion of a cut is passing through the master retarder. Other information associated with this particular cut, including the route information, is transferred forward prior to the time that the cut of cars completely clears the master retarder. It is desirable, therefore, in the transfer of the leaving velocity information, to be able to modify the indication transferred forward at the location to which other corresponding information has advanced. Such modification will allow the $R_c$ factor as calculated to be used if it is appropriate, that is, if the correct leaving velocity out of the master retarder is attained prior to the time that the cut completely clears this retarder. The problem, it is apparent, is thus complicated by the desire not only to transfer forward the information regarding the correct speed of the cut, but to modify this information until the last possible moment based on changes as rear portions of the cut continue to move through the master retarder.

Accordingly, it is an object of my invention to provide means for transferring the speed information in an automatic classification yard control system.

Another object of my invention is to provide means to register information relating to the leaving speed of a particular cut from the master retarder at following locations in a classification yard.

It is also an object of my invention to provide a circuit arrangement in an automatic control system for a classification yard to register whether or not a cut of cars leaves a master retarder at the selected correct leaving velocity and to transfer this information to the group retarder through which that cut of cars will pass.

A still further object of my invention is to provide, in an automatic control system for a classification yard, a transfer circuit arrangement for the master retarder exit speed information which arrangement will permit the modification of the transferred information until the corresponding cut of cars clears the master retarder.

It is also an object of my invention to provide, in an automatic control system for classification yards, a circuit means actuated by the automatic switching system to transfer a correct leaving velocity function from the master retarder location to the various group retarder locations.

Still another object of my invention is to provide a transfer circuit arrangement controlled by an automatic switching system of a railway classification yard to transfer a correct leaving velocity factor from the master retarder to the group retarder location, but which will permit modification of the registered velocity factor in any storage bank until the end of the corresponding cut clears the master retarder.

Other objects, features, and characteristics of my invention will appear as the specification progresses.

In practicing my invention, I provide a relay to register whether or not the speed of a cut of cars leaving the master retarder is the selected leaving speed for that particular cut, as may be determined in several different ways. The position occupied by this relay may vary as the speed of the cut of cars passing through the retarder varies above or below or matches the correct leaving speed. In the particular embodiment shown, there can be no operation of this registry relay until the leading portion of the cut occupies the switch detector section immediately beyond the master retarder. It may be said in other words that this speed registering relay indicates "yes" or "no" as to the speed of the cut of cars matching the selected leaving speed. I also provide an end-of-cut registry relay which is energized when the end of the cut is detected at the exit end of the master retarder. A register or storage relay for each of these functions, that is, the correct leaving speed and the end-of-cut function, is provided in each storage bank of the automatic switching system from the second switch following the master retarder through the succession of storage banks to the group retarder storage banks. The transfer of the registered leaving speed and end-of-cut functions occurs in step with the route storage transfer providing the registry of the two information functions has been made final in the first storage bank in which it is inserted. The registry and transfer circuits are arranged, however, to permit modification of the leaving speed function in any bank in which it would have otherwise been transferred providing that this modification occurs prior to the recording of end-of-cut. The correct leaving velocity information as registered in the final bank to which it is transferred is read out of this group retarder storage unit into a repeater relay which then selects between the calculated and average values of a rolling resistance factor. This read-out of the leaving speed function is actuated by the arrival of the leading portion of the corresponding cut of cars at the cut length detector section ahead of the group retarder. The read-out also registers in the repeater relay as a "yes" or "no" indication and selects, respectively, the actual or the average value of the rolling resistance factor.

Referring now to the drawings:

FIG. 1 shows in a conventional manner the layout of a small railroad classification yard to which the arrangement of my invention may be added.

Figure 2A:
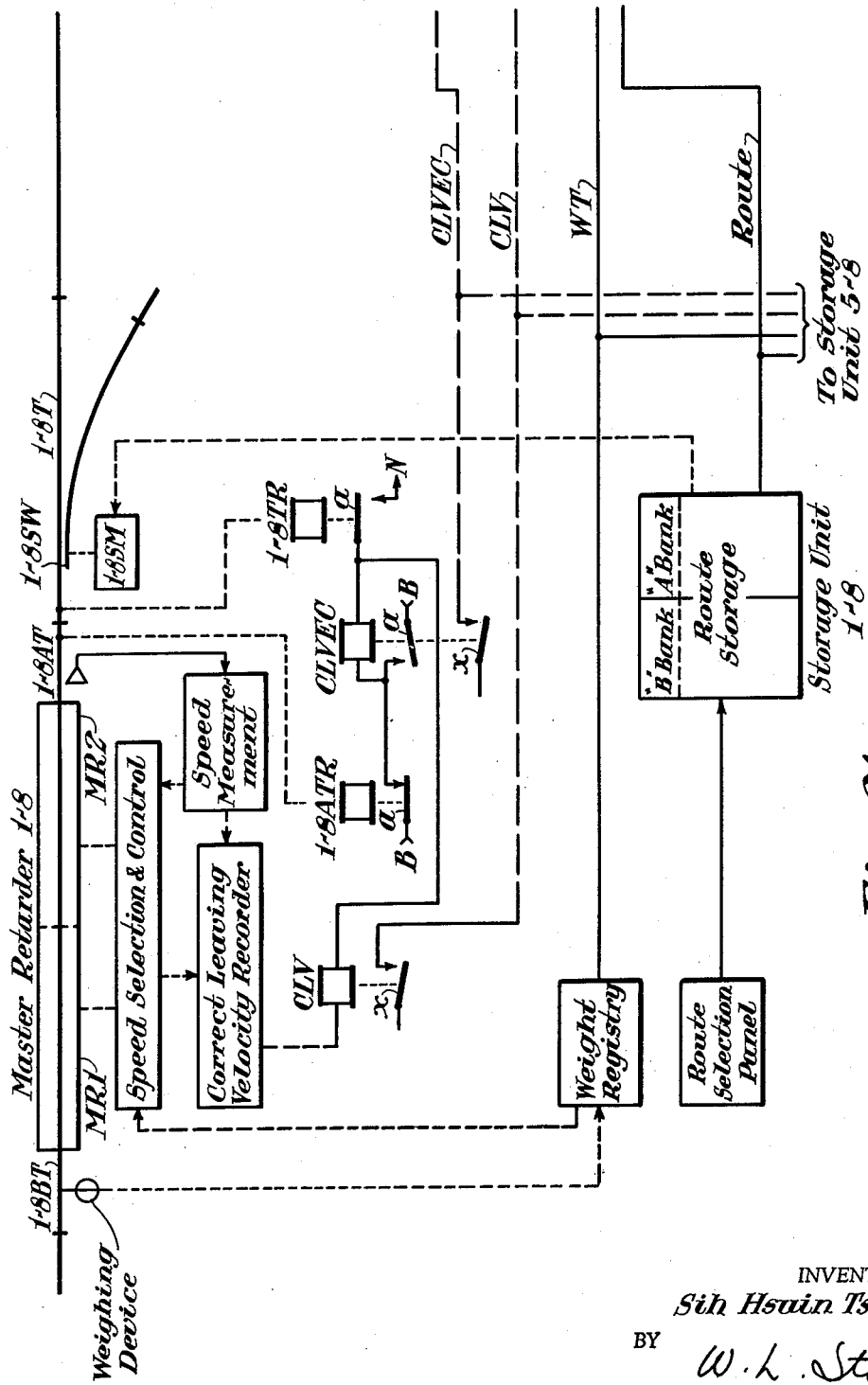
Figure 2B:
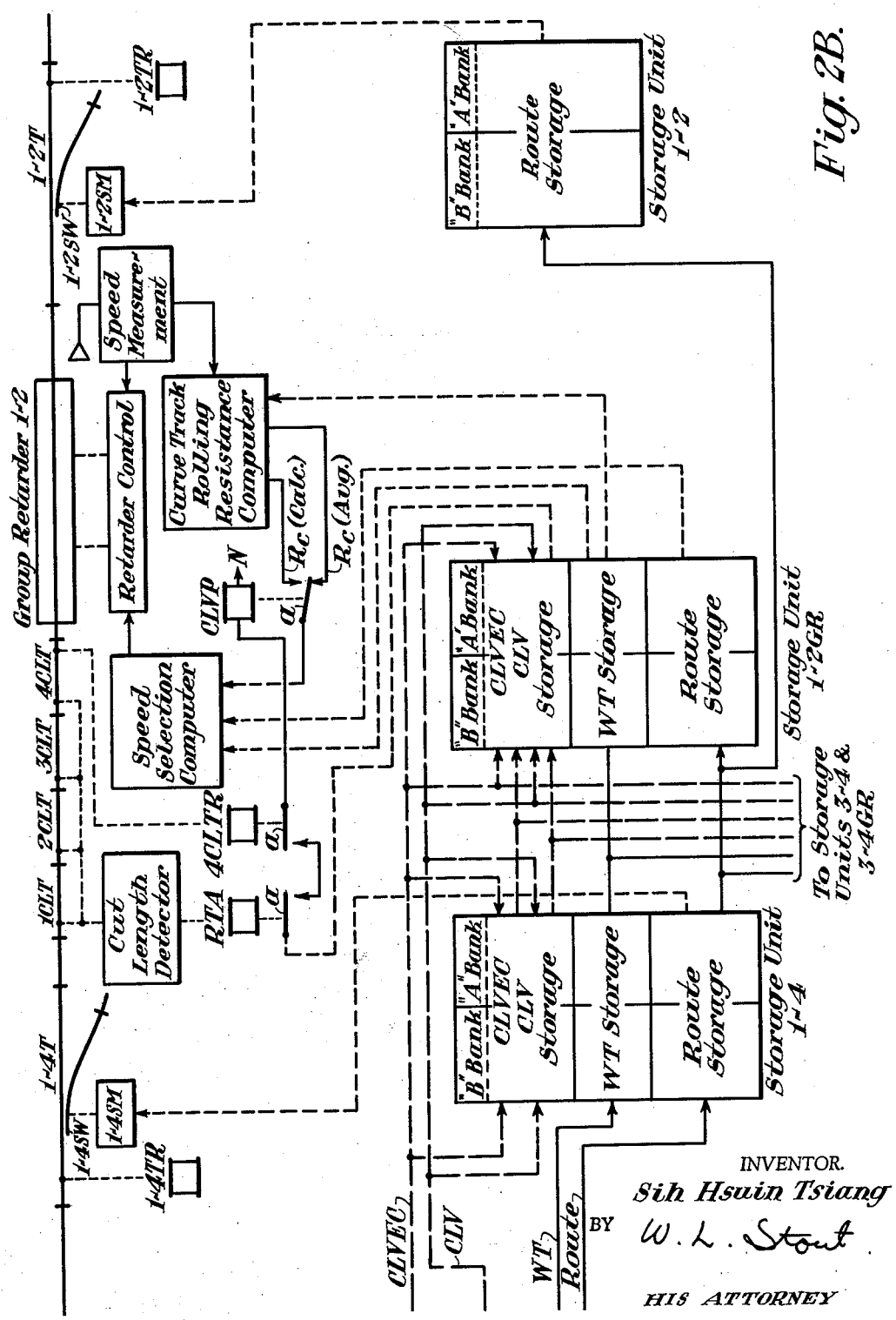

FIGS. 2A and 2B taken together show, generally in block diagram form, the flow of information through the storage units associated with one route in the yard of FIG. 1.

Figure 3A:
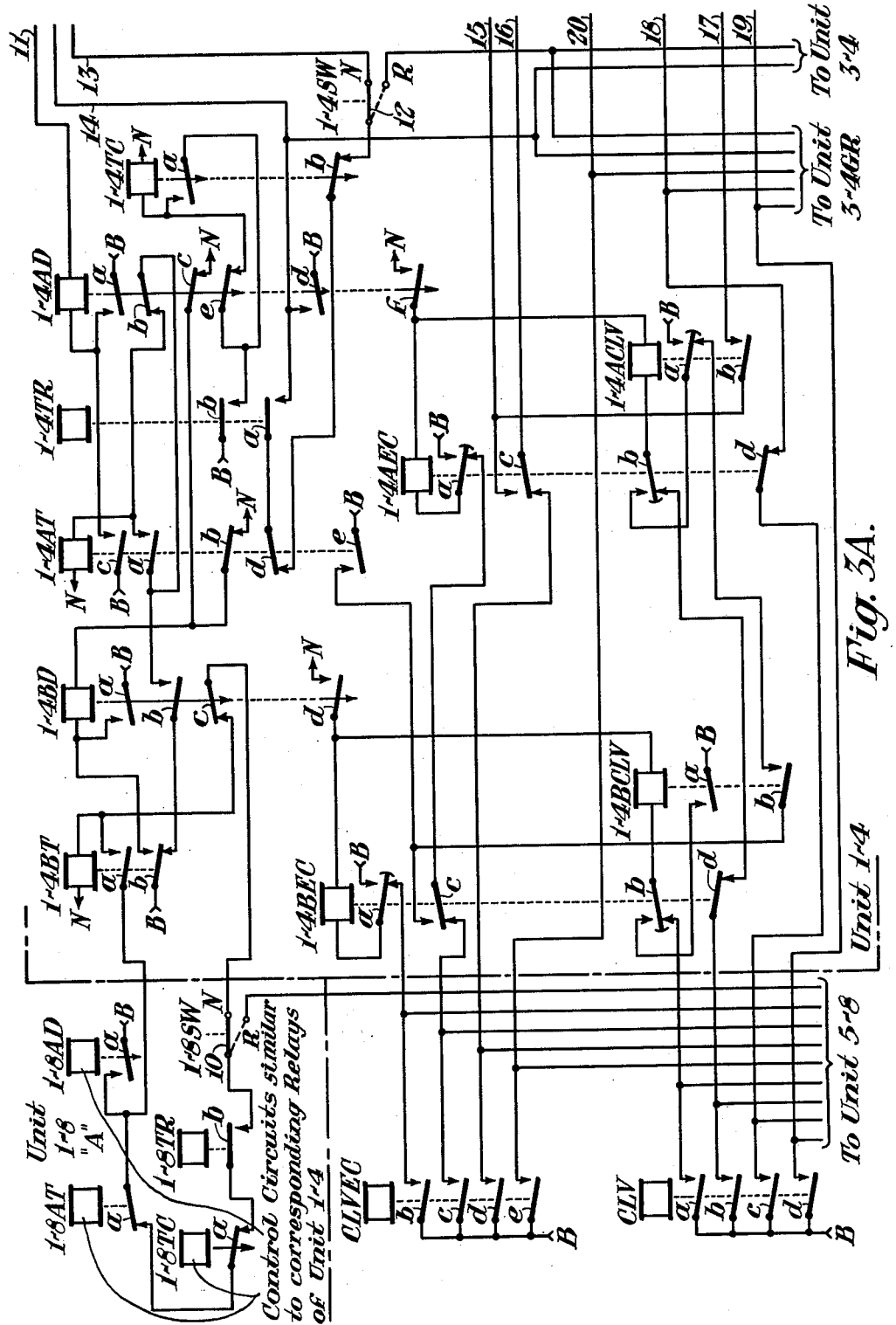
Figure 3B:
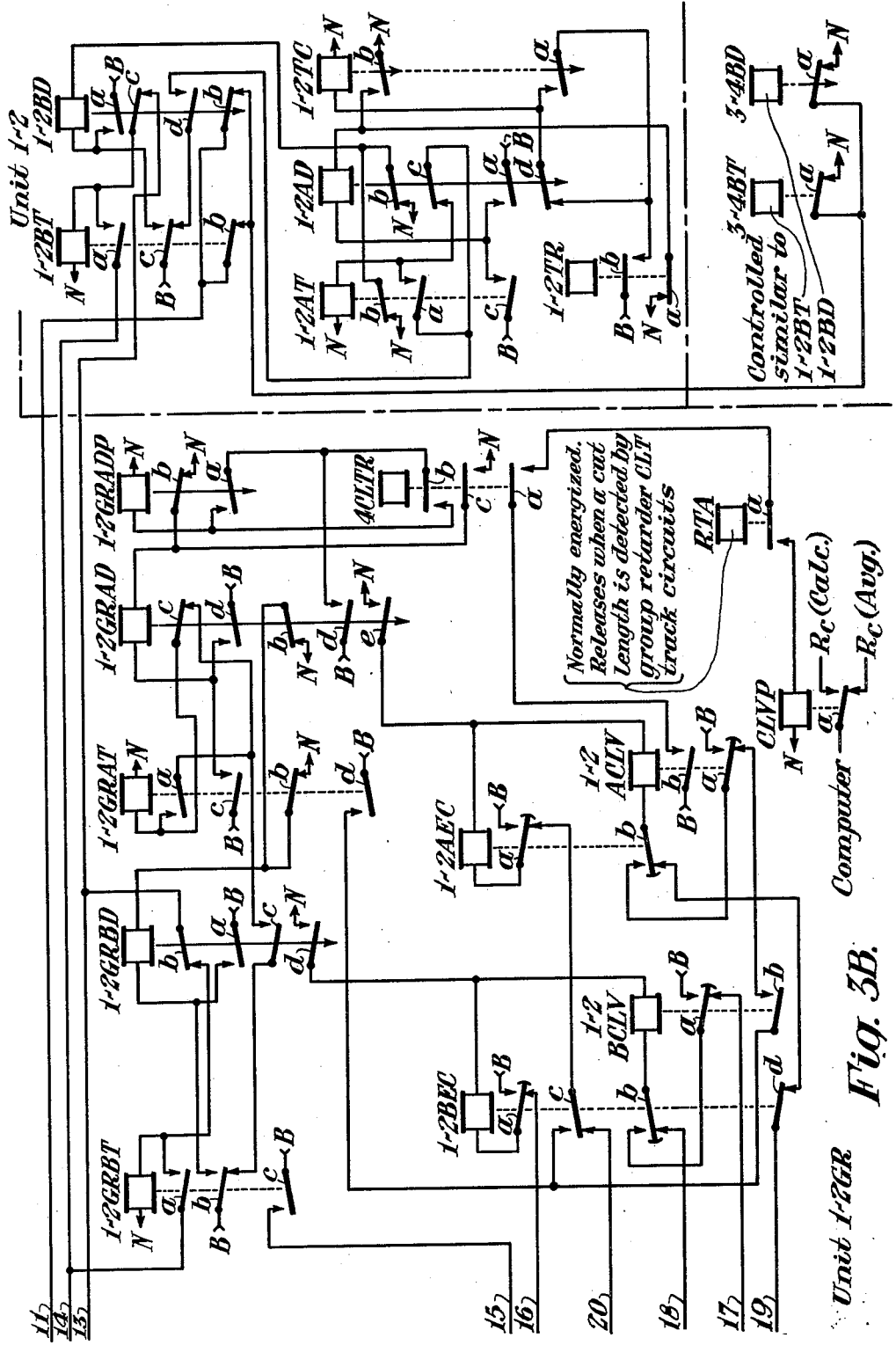

FIGS. 3A and 3B taken together provide a diagrammatic showing of a circuit arrangement, embodying one form of my invention, to transfer and modify correct leaving speed information in the storage units of FIGS. 2A and 2B.

Similar reference characters refer to similar parts of the apparatus in each of the figures of the drawings.

Referring again to FIG. 1, an eight track railroad classification yard is shown therein using conventional symbols well known in the art. It is to be understood, of course, that my invention is not limited to a classification yard including only eight storage tracks or to a yard having the balanced form of the yard shown in FIG. 1. This eight track yard is provided, as the title indicates, with eight storage tracks numbered successively 1 to 8 from top to bottom at the right of the drawing. These storage tracks are divided into four groups of two tracks each. Cuts of cars move from left to right into the storage tracks, progressing from an elevated hump down the lead track through a master retarder and thence over the various switches into the designated storage track. The switches are designated by the reference characters SW preceded by a hyphenated numerical prefix which indicates the storage tracks to which cars moving over that particular switch may travel. Thus, the lead switch over which all cars must pass is designated by the character 1–8SW, while the final switch employed in the routes to storage tracks 1 and 2 is designated by the reference character 1–2SW. Although it is not specifically shown in FIG. 1, it is to be understood that this yard is provided with an automatic switching system to control the positioning of the various switches to establish the selected routes to the storage tracks for the successive cuts of cars. Preferably, the switching system is of the type shown in the copending application for Letters Patent of the United States Serial No. 592,198, filed June 18, 1956 by John R. George and Sih Hsuin Tsiang for Automatic Control of Railway Classification Yard Track Switches, now Patent No. 2,863,992, issued December 9, 1958, this patent having a common assignee with the present application. Briefly, the switches in this yard are controlled according to selected route storages for each cut which are transferred from switch location to switch location in accordance with the progress of the corresponding cut of cars. These cuts of cars move under the influence of gravity from the hump at the left to the various storage tracks according to the preselected routes. For purposes of coordination, it will be considered that a switch positioned to move a car to the left is in its normal position, in which all of the switches in the yard are conventionally shown.

The classification yard of FIG. 1 is also provided with a speed control system utilizing car retarders. Preferably, this system is of the type disclosed in the previously mentioned application of Fitzsimmons and Robison. A master retarder 1–8 located between the hump and the lead switch to the yard is shown as comprising two sections MR1 and MR2. It will be assumed herein that this initial control of the speed of a cut of cars by the master retarder is in accordance with the weight classification of the cut, although other factors may also be used in determining the speed control enforced. However, the operation of the group retarders, such as group retarder 1–2, is in accordance with many factors and is not limited to the weight classification alone. Four of the group retarders are provided in this yard, one for each group or pair of storage tracks. These group retarders are shown in the drawings are located just ahead of the final switch controlling the routes to the corresponding storage group. The speed control exercised by such a retarder may be in accordance with a plurality of factors such as weight, rolling resistance, distance to travel, and others. It is obvious that each cut moving from the hump to a storage track passes through two retarders, the master retarder and one of the group retarders.

Referring now to FIGS. 2A and 2B, taken together with FIG. 2A at the left and with the similarly designated connections matching, these drawings show, partly schematically and partly by block diagram, the general apparatus necessary to control cuts of cars moving to the first track group, that is, storage tracks 1 and 2. Across the top of these drawings, the stretch of track through master retarder 1–8 and group retarder 1–2 is shown by a conventional single line representation. This stretch of track includes lead switch 1–8SW, intermediate switch 1–4SW, and group switch 1–2SW. In the showing of each of these switches, the route over the switch reversed, that is, to the right, is shown with a stub end since a description of the single route to track 1 will provide sufficient description for an understanding of my invention.

Each of these switches is provided with a power switch movement designated by the reference character SM with the same numerical prefix as the associated switch. These switch movements are shown by a conventional block as they may be of any type of power switch movement known in the art. For example, they may be of the well known electro-pneumatic type switch movement. These switch movements are controlled by the automatic switching system with which the classification yard is provided, the control for each switch movement being indicated by a conventional dotted line terminating at the switch movement and originating in the A bank of the associated storage unit as will be described more fully hereinafter.

Various detector track sections are provided in the route to track 1 and are set off from the remainder of the stretch of track by insulated joints. These insulated joints are shown in the usual conventional manner for such single-line track diagrams. Each switch is provided with a detector section designated by the reference character T preceded by a numerical prefix the same as the switch number. For example, leading switch 1–8SW is provided with a detector track section 1–8T and the following switches along the route shown have associated therewith sections 1–4T and 1–2T, respectively. The track within the master retarder area is divided into two track sections designated 1–8AT and 1–8BT. In the track immediately in approach to group retarder 1–2 are four cut length detector sections designated 1CLT, 2CLT, 3CLT, and 4CLT, in order approaching the group retarder.

Each of the detector track sections is provided with a track circuit including a track relay. However, not all of these track relays are indicated in the present diagram since all do not enter into the description of the system of my invention. These track circuits may be of any well known type, for example, they may be a direct current, neutral track circuit supplied by a battery and including a neutral direct current track relay. Each relay shown is designated by the reference character TR prefixed by a numerical designation the same as the track circuit with which it is associated. Thus the detector section for the leading switch has a track relay 1–8TR while the second section within the master retarder has a track relay 1–8ATR. Control of each of the track relays by the associated track section is shown by a conventional dotted line, as such track circuits and their operation are well known in the art. Briefly, when the track section is unoccupied the associated track relay is energized and in its picked-up position. With the track section occupied, the track circuit is shunted and the associated track relay is denergized and released.

It is to be noted at this point that the apparatus at each of the locations shown in FIGS. 2A and 2B, and also in FIGS. 3A and 3B to be discussed hereinafter, is provided with a local source of direct current energy which may be a battery of proper size and capacity. However, these batteries, or a single system battery if desired, are not shown as such, but only the positive and negative terminals thereof are indicated, designated in a conventional manner by the reference characters B and N, respectively. Also in each of the drawings, relays which are provided with slow release characteristics are so designated by a downward pointing arrow drawn through the movable portion of each of the relay contacts. Certain of the relays are provided with transfer contacts of the continuity type, that is, of the type in which the front contact is made before the corresponding back contact opens. Such continuity transfer contacts are here designated by a short arc appended to the end of the movable portion of the transfer contact, this symbol being well known in the art. The various relays which are shown in FIGS. 2A and 2B, in connection with the general arrangement of the system, are also shown in FIGS. 3A and 3B which, as hereinbefore described, show detail circuit arrangements. For each of these relays, the controls, whether they be in detail or by conventional manner, are shown only in FIG. 2A or 2B where the relay occurs. At the second showing of each of these relays in FIGS. 3A and 3B, only the symbol for the relay winding is shown with no control circuits, it being understood that the control arrangements for such relays are as designated in FIG. 2A or 2B.

All cars entering the classification yard, and particularly those routed to storage track 1, pass through master retarder 1–8 which controls the speed of a car to a preselected level. For purposes of the present description, it will be assumed that the leaving speed selection for the master retarder is in accordance with the weight classification of the cut of cars passing therethrough. However, other factors may be used in connection with selecting the desired leaving speed and the system of my invention may be applied to such systems as well. In approach to the master retarder is a track-side weighing device which may be similar to the type disclosed in Letters Patent of the United States No. 2,779,583, issued January 29, 1957 to Herbert L. Bone for a Vehicle Weight Responsive Means. Briefly, this weighing device and the weight registry system may provide for the dividing of all cuts of cars into three weight classifications which are then registered in a weight registry means. Preferably, the system of registering the weight as determined by the weighing device of the Bone patent is similar to that shown by Letters Patent of the United States No. 2,819,682 issued January 14, 1958 to Edward C. Falkowski for a Car Retarder Speed Control Apparatus. From the weight classification registered, speed selections are made as to the desired leaving speed from the master retarder. Such control is shown here conventionally by a dotted line from the weight registry unit to the speed selection and control unit for the master retarder. Reference is made to the aforementioned Bone patent and Falkowski patent for a detailed description of the weight registering means.

The speed of a cut of cars moving through the master retarder is preferably measured by a radar method as shown in the aforementioned Fitzsimmons and Robison application. The information from the radar unit, shown conventionally at the exit end of the master retarder, is fed into a speed measurement unit and from there into the retarder speed selection and control unit. In accordance with the selected leaving speed fed into the retarder control unit from the weight registry, the speed measurement is used to modify the braking action in order that the selected leaving speed from the master retarder for a particular cut of cars may be attained. These connections are here shown in the conventional manner and reference is made to the Fitzsimmons and Robison application for a description of the details of the retarder control.

The selected leaving speed in the master retarder and the actual speed measurement of the cut of cars are also fed into the correct leaving velocity recorder shown by rectangular block in FIG. 2A. The details in the operation of this unit are completely described in the aforementioned Fitzsimmons and Robison application and are not shown here as they form no part of the specific details of my invention. It is sufficient herein to understand that if the speed of the cut moving through the master retarder equals or matches the selected leaving speed, the voltage output of the correct leaving velocity unit is sufficient to energize the correct leaving velocity relay CLV. This output circuit in addition to the winding of relay CLV includes back contact a of track relay 1–8TR. It is thus apparent that no registry of the correct leaving velocity can occur until the leading wheels of the car cut occupy section 1–8T causing the release of track relay 1–8TR. After this time, however, relay CLV is held energized or is deenergized as the speed of the cut of cars matches or varies from the selected leaving speed, respectively.

An end-of-cut indication means is also provided at the master retarder location to lock or make final the correct leaving velocity indication registered. The end-of-cut is based on the occupancy of the various track sections within and adjacent to the master retarder. The correct leaving velocity end-of-cut relay CLVEC is provided with an energizing circuit including front contact a of track relay 1–8ATR, the winding of relay CLVEC, and back contact a of relay 1–8TR. It is obvious that relay CLVEC will be energized when the rear of a cut clears the master retarder and associated track section 1–8AT but is still occupying switch detector section 1–8T. To allow for the close approach of a following cut of cars, relay CLVEC is provided with a stick circuit including its own front contact a and relay winding and back contact a of relay 1–8TR. This serves to hold the relay energized until the cut which actuated the indication has cleared the leading switch detector section. Although the actual circuits herein shown are not identical with those shown in the Fitzsimmons and Robison application, the operation is equivalent and serves to provide the same function.

The system herein shown includes an automatic switching system to control the routing of cars to the various storage tracks. A route selection panel shown in block form in FIG. 2A allows a selection of a storage track for each cut of cars moving over the hump. This route selection establishes the controls to position the switches to properly route the cut. The route selection may be by manual operation or by some form of automatic selection such as a pre-cut tape. The route storages, that is, the switch controls, transfer from switch location to switch location as the corresponding cut of cars progresses through the yard. Reference is made to the previously mentioned George and Tsiang patent for further description of this operation. Briefly, the storage units 1–8, 1–4, and 1–2 associated with switches 1–8SW, 1–4SW, and 1–2SW, respectively, provide for the storage of the selected route and its appropriate transfer at the related switch location along the route shown in FIGS. 2A and 2B. In FIG. 2B, there is shown an additional storage unit 1–2GR which is associated with group retarder 1–2 to provide a means of storing the various information factors which provide the speed control for this retarder. Storage unit 1–2GR, which is in multiple with the final route storage unit 1–2 associated with switch 1–2SW, is of the nature of a phantom location at the group retarder. Each of the storage units shown is provided with two storage banks, an initial bank B into which route storages and other information initially are fed and a final bank A from which the switch controls are taken and from which the information is transferred to the following location.

The transfer operation is completely described in the aforementioned George and Tsiang patent. Briefly, however, when a car occupies the switch detector section, the route storage transfers forward to the next location along the route providing that the initial storage bank at the following location is empty to receive the transfer. At any one location, the transfer from bank B to bank A occurs automatically as soon as the A bank is empty of any storage. Switch control, as previously mentioned, is from the A bank only, as shown conventionally by dotted lines, where each switch as in the present system is a single switch. In FIGS. 2A and 2B, the transfer of the route storages is shown conventionally by single line connections between the various storage units. These connections, between the two figures are designated by the reference word "route" and serve as a flow diagram to indicate the advancement of the route storages to control the switches as the corresponding cut of cars progresses through the yard. No transfer is indicated between the two banks of each storage unit, such occurring automatically as the final bank becomes empty. It is to be noted that there is a parallel transfer of routes from storage unit 1–4 into units 1–2 and 1–2GR. Branch paths indicate, in accordance with the notes on the drawings, the transfer of route storages when appropriate to the other switch locations shown in FIG. 1.

In the system shown herein, the transfer of weight information and such other factors or functions as may be desired occurs in a similar manner. The transfer of these functions is controlled by the route transfer and occurs along the same general paths as previously discussed. The transfer of the weight information from the weight registry unit at the master retarder to the weight storages in the following units is indicated along the connection line designated WT. Weight classification as registered is initially recorded in the weight storage section of unit 1–4 and from here transfers to storage unit 1–2GR at the appropriate time. There is no parallel transfer of the weight to the final storage unit 1–2 associated with switch 1–2SW as the weight storage can serve no function at that switch location. Branch transfers to other locations as appropriate are indicated on the drawing.

The correct leaving velocity and the correct leaving velocity end-of-cut information are transferred from the master retarder location where they are registered to the following storage units in a manner similar to that in which the weight and other information is transferred. Each of these two functions are forwarded as an "on" or "off" indication, that is, a "yes" or a "no." As indicated in FIG. 2A, this transfer is controlled, at least initially, by front contacts of the corresponding relays CLV and CLVEC. Front contact $x$ of each of these relays, as shown in FIG. 2A, is representative of the plurality of front contacts of each relay over which the parallel transfer of the associated information is actually accomplished as will be described in more detail later. Transfer paths are indicated by the dash lines in FIGS. 2A and 2B which extend the control of front contact $x$ of each relay to the storage units at locations 1–4 and 1–2GR, as specifically shown in these drawings. A stated object of my invention is to permit modification of the correct leaving velocity information into the storage bank in which it is registered up until the time that the end-of-cut indication is registered. Thus both functions CLV and CLVEC feed in parallel paths into the various storage banks of the system. As specifically shown in FIG. 2B, this multiple input includes both bank A and bank B of storage unit 1–4 and bank A and bank B of storage unit 1–2GR. As will appear later when the circuits are described in detail, the information feeds into the bank in which the corresponding route information has cascaded. As indicated in the drawings, branch paths exist for the transfer of these functions to unit 5–8 and also to units 3–4 and 3–4GR when the corresponding route storage transfers along such alternate paths in establishing the route designated for the associated cut of cars.

The multiple feed into the storage units 1–4 and 1–2GR is necessary since the physical distances between the master retarder and the group retarder are such that it is possible for the route information to have cascaded forward to any one of these banks prior to the time that the correct leaving velocity function is made final. This latter action occurs, of course, when relay CLVEC picks up to indicate the end of the corresponding cut of cars, that is, that the rear of the cut has cleared the master retarder. The picking up of relay CLVEC locks the CLV information into whichever storage bank it is then registered. Following this, the CLV function transfers along with the corresponding route storage in accordance with the progress of the associated cut of cars.

The various items of information received in storage unit 1–2GR are used to control group retarder 1–2 for the corresponding cut of cars. The read-out for this control is from the A bank only of the storage unit as indicated by various dotted lines emerging from the A bank storages. Group retarder 1–2 is provided with a retarder control unit similar to that provided for master retarder 1–8. However, the selected leaving speed feeds into this control unit from the speed selection computer. The actual measured speed of the cut of cars passing through the group retarder is measured, preferably by radar means shown conventionally near the retarder exit end, and is fed from the speed measurement unit into the control unit so that the braking action of the group retarder may be controlled accordingly to obtain the selected leaving speed.

The speed measurement of the cut of cars approaching the group retarder is also used to compute a curved track rolling resistance factor, herein designated by the symbol $R_c$. The $R_c$ computer uses the measured speed of the approaching cut of cars and the selected leaving speed from the master retarder as determined from the weight classification storage, which is fed into the $R_c$ computer as indicated by the dotted line from bank A of unit 1–2GR, to compute acceleration for the cut of cars between the master retarder and the group retarder. This acceleration may be transformed into the rolling resistance factor $R_c$ as is more fully described and shown in the previously mentioned copending Fitzsimmons and Robison application, to which reference is made for complete understanding of this action. However, the $R_c$ computer actually provides two outputs. A first output is the calculated value of the rolling resistance factor determined as described above. A second output is an average value of rolling resistance for the cuts of cars in the yard which is periodically adjusted for the weather and the season of the year.

It will be obvious that the calculated value of $R_c$ is not the actual value if the desired master retarder leaving speed was not attained. In such instances, the use of the average value factor will provide a much better operation of the system. The choice thus is made between the calculated and the average value for the factor $R_c$ in accordance with the registered information concerning the correct leaving velocity function. As actually shown in FIG. 2B, the selection is made by transfer contact *a* of the correct leaving velocity repeater relay CLVP which selects the average $R_c$ over its back contact *a* and the calculated value over its front contact *a*. As indicated in the drawing, relay CLVP repeats the position or condition of the correct leaving velocity function as recorded in bank A of storage unit 1–2GR. If relay CLV at the master retarder location is energized, the function as stored in bank A of unit 1–2GR will cause the energization of relay CLVP over a read-out circuit, indicated in part conventionally by a dotted line, extending from the bank A CLV storage over back contact *a* of cut length detector relay RTA and back contact *a* of track relay 4CLTR to the winding of relay CLVP.

Relays RTA and 4CLTR are controlled in accordance with the occupancy of the cut length detector track circuits in the approach to group retarder 1–2. These four track circuits, designated 1CLT, 2CLT, 3CLT, and 4CLT, respectively, are occupied successively by cuts of cars approaching the group retarder. The operation of this arrangement and complete circuit details are shown in the copending application for Letters Patent of the United States Serial No. 696,406, filed November 14, 1957 by Joseph M. Berill for a Cut Length Detector, now Patent No. 2,976,401, issued March 21, 1961, this patent having the same assignee as the present application. Reference is made to this patent for a complete description of the operation of the cut length detector, particularly in relation to relay RTA. Briefly, the apparatus determines the cut length in several increments. Relay RTA is normally energized by the detector unit and released only if the cut length detected is below a preselected maximum length. Relay 4CLTR is a normally energized track relay which is shunted and releases when the associated track circuit 4CLT is occupied by any part of a cut of cars. When no cut of cars is passing through the detector sections, or when an extra long cut approaches the retarder, relay RTA remains energized. It is thus apparent that repeater relay CLVP can only be energized in accordance with the CLV function stored in bank A of unit 1–2GR when the approaching cut of cars corresponding to the information storage occupies section 4CLT and if the length of the cut of cars is less than the preselected maximum length so that relay RTA is released. If this condition is not present, relay CLVP remains released so that the average value of factor $R_c$ is selected for entry into the speed selection computer.

All of the information fed into the computer from the various storage banks and other sources is used to compute the proper leaving speed for the cut of cars from the group retarder which will enable the cut to arrive at the position of the next preceding car in the selected track and couple with that car without damage to the cars or their contents. The various factors which may enter into this computation of the leaving speed, and which are more fully described in the aforementioned copending Fitzsimmons and Robison application, include the tangent track rolling resistance, the weight classification of a cut of cars, the curved track rolling resistance $R_c$, the cut length, the distance the cut of cars has yet to travel, and other factors concerning the weather and track characteristics. The computer selects or computes a correct leaving speed and feeds this information into the retarder control unit from which the retarder braking action is properly controlled in accordance with the actual speed of the cut of cars passing therethrough.

I have thus described in general terms the operation of the complete system which embodies the details of my invention. This description has shown the need and the utility of registering and transferring the correct leaving speed factor for cuts of cars leaving the master retarder. This function, which is recorded as a "yes" or "no," i.e., that the selected leaving speed was or was not attained, is registered and transferred to following locations. This function transfer is synchronized with the transfer of the corresponding route storage which controls the positioning of the switches to route the cut of cars to the selected storage track. I shall now describe in more detail the apparatus and circuit arrangement by which the transfer and modification of the correct leaving velocity function CLV and the associated correct leaving velocity end-of-cut indication CLVEC is accomplished.

Referring now to FIGS. 3A and 3B, when taken together with FIG. 3A at the left and the corresponding connecting lines matching, these drawings show a circuit arrangement for transfer of the CLV and CLVEC functions embodying one form of my invention. Across the top of each of these figures and at the right of FIG. 3B are the relays for controlling the transfer of the information in the general system. These relays are actually part of the automatic switching system for this classification yard as shown in the aforementioned George and Tsiang patent. The basic reference characters for these relays herein used are the same as the reference characters used in this George and Tsiang patent, to provide a point of continuity between the herein described operation and the prior patent so that easy reference may be had for a complete description. Briefly, the relays designated by the reference character T are the transfer relays which initiate and control the transfer operation of the information from one storage bank to another, both within the same storage unit and between storage units at different locations. The storage detector relays D, when energized, hold a storage within a storage bank and serve as a means of indicating that a storage has already been inserted into the associated storage bank. Transfer control relays TC, when used, serve to assure that only one transfer of storages can occur from the final bank of a unit to the initial bank of the subsequent storage unit for each occupancy of the corresponding switch detector section. Also shown are the windings of the corresponding track relays TR whose conventional control circuits are indicated, as previously discussed, in FIGS. 2A and 2B and are not here repeated.

Each of the relays T, D, and TC has included in their particular designation a prefix number and letter to distinguish between the relays in each bank. The letter prefix indicates the storage bank of the storage unit with which the relay is associated. Herein, with only two storage banks in each unit, the letters A and B are sufficient to distinguish between similar relays. The numerical prefix indicates the storage unit with which the relay is associated, that is, storage unit 1–8, 1–4, or 1–2. In addition, the relays associated with the phantom storage unit 1–2GR include the letters GR in the prefix to distinguish them from the relays in the regular storage unit 1–2. Since the transfer of all information other than the switch controls, and especially the functions CLV and CLVEC, for the route to track 1 indicated in FIGS. 2A and 2B, starts with storage unit 1–4, only this storage unit and following units along the associated route are shown in detail. That is, the detailed circuits for units 1–4, 1–2GR, and 1–2 are shown. However, in the upper left of FIG. 3A, the control relays for bank A of unit 1–8 are shown without their control circuits in order to provide a better understanding of the initial registry of these information functions in bank B of unit 1–4. The circuits associated with the transfer of the CLV and CLVEC functions which are included in unit 1–4 are shown to the right of the dot-dash vertical line in FIG. 3A. In FIG. 3B, the circuits of unit 1–2GR are shown to the left of the vertical dot-dash line with the transfer control circuits of unit 1–2 being shown to the right of this line. In each unit shown in detail, circuits for both bank B and bank A are included.

Briefly summarizing, the operation transferring the information into any storage bank is initiated by the energization of the transfer relay T. Between banks in a unit, a succeeding relay T picks up if the associated storage bank is empty of any storage, that is, is in condition to receive a new storage. Between storage units, that is, from the final bank of one unit to the initial bank of the following unit, the energization of relay T is controlled not only by the ability of the subsequent storage bank to receive a new storage, but also by the occupancy of the switch detector section of the switch corresponding to the preceding unit. In addition, the energization of the transfer relay in the subsequent unit is also controlled so that only one transfer between the storage units occurs with each occupancy of the track section. The storage transfer between any two banks is completed by the energization and resulting pickup of the storage detector relay D. Each relay D holds the storage within the corresponding storage bank until the transfer from that bank to the next bank is complete so that there will be no loss of information between banks.

As an example of initiation of a storage transfer between storage banks within a single unit, relay 1–4AT is energized by a circuit from terminal B over back contact $b$ of relay 1–4BT, front contact $b$ of relay 1–4BD, back contact $b$ of relay 1–4AD, and the winding of relay 1–4AT to terminal N. It is apparent that this circuit is complete to energize the transfer relay to initiate a transfer into bank A only when the associated detector relay 1–4AD is deenergized to indicate that the bank is empty, when the preceding detector relay 1–4BD is energized to indicate that a storage exists in the preceding bank, and when the preceding transfer relay 1–4BT is deenergized to indicate that the transfer of the storage into bank B has been completed. Once energized, relay 1–4AT is held energized over a stick circuit including its own front contact $a$, front contact $b$ of relay 1–4BD, and back contact $b$ of relay 1–4BT. As will appear shortly, this stick circuit is interrupted upon the completion of the transfer from bank B to bank A when relay 1–4BD is deenergized and releases after its associated bank is empty.

As an example of the initiation of storage transfer from the final bank of one unit to the initial bank of the succeeding unit, the energizing circuit for relay 1–4BT may be traced from terminal B over front contact $a$ of relay 1–8AD, back contact $a$ of relay 1–8AT, back contact $a$ of relay 1–8TC, back contact $b$ of relay 1–8TR, switch controller contact 10 of switch 1–8SW in its normal position, shown solid in the drawing, back contact $c$ of relay 1–4BD, and the winding of relay 1–4BT to terminal N. The stick circuit for relay 1–4BT includes front contact $a$ of relay 1–8AD and front contact $a$ and the winding of relay 1–4BT. The relays of bank A of unit 1–8 shown in the upper left of FIG. 3A are controlled in a similar manner to the corresponding relays of bank A of unit 1–4. Relay 1–8AT is similar to relay 1–4AT just described above and is thus released as soon as the transfer into bank A of unit 1–8 is complete. Relay 1–8AD is similar to storage relay 1–4AD whose operation will be described shortly. Relay 1–8AD, briefly, is held energized as long as a storage is held in bank A of unit 1–8. Transfer control relay 1–8TC is controlled in a manner similar to relay 1–4TC of unit 1–4 whose operation will be described shortly. Briefly, this relay is energized at the completion of a transfer out of bank A into the following bank and is then held energized as long as the corresponding cut of cars occupies detector section 1–8T. The operation of relay 1–8TR has already been described. Contact 10 repeats the position of switch 1–8SW, which for the route to track 1 must be in its normal position. It is thus apparent that relay 1–4BT can be energized to initiate a route transfer from bank A of unit 1–8 only if bank B of unit 1–4 is empty and a storage is held in bank A of unit 1–8, the transfer of this storage into bank A being complete. Also, the track section of the corresponding switch must be occupied and no other transfer must have occurred during this particular track occupancy.

The actual transfer of information storages from bank A of unit 1–8 into bank B of unit 1–4 cannot occur until storage detector relay 1–4BD is energized and picks up. This action will become more apparent shortly when the transfer of the function CLV is described. For the present, it is sufficient to point out that the energizing circuit for relay 1–4BD is traced from terminal B at front contact $b$ of relay 1–4BT, this front contact being closed to initiate the storage transfer, through the winding of relay 1–4BD and the multiple paths to terminal N over back contact $b$ of relay 1–4AT and back contact $c$ of relay 1–4AD. The multiple path to terminal N over the back contacts of relays 1–4AT and 1–4AD assures that the storage transfer into bank B from the preceding unit will occur only if no transfer into bank A is in progress. Relay 1–4BD is held energized by a stick circuit including its own front contact $a$ and back contacts $b$ and $c$ of relays 1–4AT and 1–4AD, respectively. The stick circuit serves to hold relay 1–4BD energized and the storage in bank B until a succeeding transfer occurs from bank B to bank A at the completion of which relay 1–4BD releases to cancel the information stored in bank B.

The transfer of information from bank B to bank A within unit 1–4 also cannot occur even though relay 1–4AT may be energized until storage detector relay 1–4AD is also energized to store the information. The energizing circuit for relay 1–4AD extends from terminal B at front contact $c$ of relay 1–4AT, through the winding of relay 1–4AD, wire 11, back contacts $b$, in multiple, of relays 1–2BT and 1–2BD in unit 1–2, and back contacts $a$, in multiple, of relays 3–4BT and 3–4BD, in unit 3–4, to terminal N. The stick circuit for relay 1–4AD is similar to the energizing circuit just traced except that front contact $a$ of relay 1–4AD replaces front contact $c$ of relay 1–4AT. It is to be noted that the energizing and stick circuits for relay 1–4AD check, in a manner similar to the check made in the circuits for relay 1–4BD, the position of the transfer and storage relays in the B banks of the storage units next in order following unit 1–4. In the present instance, this includes the unit 1–2 associated with switch 1–2SW and the unit 3–4 which is associated with switch 3–4SW shown in FIG. 1. A check over the corresponding back contacts of the transfer and storage detector relays in unit 1–2GR is not included in this circuit for relay 1–4AD since the transfer of all information is synchronized with the transfer of the route information to the next switch locations indicated in FIG. 1. The transfer of route storages from switch location 1–4SW, to accomplish the principal purpose of the switching system, can occur only to the location of switches 1–2SW and 3–4SW. Until this transfer can occur, there can be no transfer of other information into the storage units associated with the corresponding group retarders. It is to be noted that, in FIGS. 3A and 3B, the switch controls, that is, the route storages, are not shown as they are not part of my present invention of transferring the functions CLV and CLVEC. The various transfers and storages of the route information are shown and claimed in the aforementioned George and Tsiang patent.

When a cut of cars destined for track 1 occupies switch detector section 1–4T, shunting track relay 1–4TR and causing it to release, a circuit is completed to initiate the transfer of the corresponding storages from bank A of unit 1–4 to bank B of unit 1–2 by energizing transfer relay 1–2BT. This circuit extends from terminal B over front contact $d$ of relay 1–4AD, which is closed since a storage is held in the associated bank, back contact $a$ of relay 1–4TR, back contact $d$ of relay 1–4AT, back contact $b$ of relay 1–4TC, switch controller contact 12, which is closed in its normal position shown solid in the drawing since switch 1–4SW is positioned normal to route cars to track 1, wire 13, back contact $c$ of relay 1–2BD, and the winding of relay 1–2BT to terminal N. The stick circuit for relay 1–2BT, in addition to its own front contact *a*, includes front contact *d* of relay 1–4AD and wire 14. This stick circuit bypasses the greater portion of the energizing circuit in order that relay 1–2BT will be held energized until the transfer action is completed even though the track section may be cleared by the corresponding cut of cars. The multiple connections to these energizing and stick circuits to control the corresponding relay in unit 1–2GR will be discussed shortly. Other branch paths exist to energize the corresponding relays in units 3–4 and 3–4GR. The branch energizing circuits for the transfer relays in these latter named units will be completed over switch contact 12 in its reverse position, shown dotted in the drawings, which it will occupy when switch 1–4SW is positioned reverse to route a cut of cars to track 3 or track 4, in which case the car will pass over group switch 3–4SW and through group retarder 3–4, as shown in FIG. 1.

When relay 1–2BT picks up, it completes the circuit for energizing relay 1–2BD. This circuit extends from terminal B over front contact *c* of relay 1–2BT, the winding of relay 1–2BD, and back contacts *b* in multiple of relays 1–2AT and 1–2AD to terminal N. This circuit is thus similar to the energizing circuit traced, for example, for relay 1–4BD. The closing of front contact *a* of relay 1–2BD completes a stick circuit for this relay which bypasses front contact *c* of transfer relay 1–2BT in the energizing circuit so that relay 1–2BD will remain energized until a transfer occurs into the A bank at this location.

In tracing the energizing circuit for transfer relay 1–2BT, back contact *b* of relay 1–4TC was included in the circuit. This contact is thus included to assure that only one storage transfer can occur from unit 1–4 into unit 1–2 for each occupancy of detector track section 1–4T. The circuit for energizing relay 1–4TC to assure this operation includes back contact *b* of relay 1–4TR, back contact *e* of relay 1–4AD, and the winding of relay 1–4TC. This circuit will be completed, when the track circuit is occupied, upon the completion of the storage transfer to the following bank which will be indicated by the release of relay 1–4AD to close its back contact *e*. Relay 1–4TC is then held energized by a stick circuit including back contact *b* of track relay 1–4TR and front contact *a* and the winding of relay 1–4TC. It is thus apparent that this latter relay will remain energized as long as the track section is occupied by that cut of cars. Thus, even though a following group of storage cascades from bank B into bank A of unit 1–4, the transfer of this second group of storages into a following bank due to the occupancy of track section 1–4T by the preceding cut of cars cannot occur since the energizing circuit for the transfer relay in either unit 1–2 or unit 3–4 is open at back contact *b* of transfer control relay 1–4TC.

Transfer of storages from bank B to bank A in unit 1–2 is controlled entirely by the vacancy of bank A. Thus the energizing circuit for relay 1–2AT is traced from terminal B over back contact *c* of relay 1–2BT, front contact *d* of relay 1–2BD, back contact *c* of relay 1–2AD, and the winding of relay 1–2AT to terminal N. This relay upon picking up completes a stick circuit at its own front contact *a* which bypasses back contact *c* of relay 1–2AD. The closing of front contact *c* of transfer relay 1–2AT completes the circuit for relay 1–2AD which also includes the winding of this latter relay and front contact *a* of track relay 1–2TR. When relay 1–2AD picks up, the transfer of a route storage from bank B to bank A may be completed, relay 1–2AD being held energized over its own front contact *a* and front contact *a* of relay 1–2TR to retain the storage in that bank until the corresponding cut of cars reaches switch location 1–2SW.

Since this is the final bank in the transfer circuits for the route storage of cuts moving into tracks 1 and 2, the circuit for detector relay 1–2AD thus differs by checking the unoccupied condition of the corresponding track section. When the cut of cars corresponding to the route storage in bank A arrives at this switch and occupies section 1–2T, shunting and thus deenergizing relay 1–2TR, the release of this relay to open its front contact *a* deenergizes relay 1–2AD which then releases, after its slow release period, to cancel the route storage. This completes a circuit for energizing transfer control relay 1–2TC which extends from terminal B over back contact *b* of relay 1–2TR, back contact *d* of relay 1–2AD, and the winding of relay 1–2TC to terminal N. Relay 1–2TC picks up and completes a stick circuit at its front contact *a* which also includes back contact *b* of relay 1–2TR. This stick circuit is effective to hold the transfer control relay energized as long as that cut of cars occupies the detector section. However, a second energizing circuit for relay 1–2AD may now be completed in order to allow another route storage to cascade into the otherwise empty bank A. This circuit includes front contact *c* of relay 1–2AT as before, the winding of relay 1–2AD, and front contact *b* of relay 1–2TC. The stick circuit for relay 1–2AD under these conditions initially includes this same contact *b* of transfer control relay 1–2TC. Relay 1–2AD is thus held energized and thus holds a second route storage in bank A since relay 1–2TC is not deenergized until track relay 1–2TR picks up to open its back contact *b*. The usual stick circuit for relay 1–2AD will be completed at front contact *a* of the track relay prior to the time that front contact *b* of relay 1–2TC opens at the expiration of the slow release period of this latter relay. This arrangement thus assures that only one route storage may be cancelled out of bank A of unit 1–2 for each occupancy of the track section associated with the corresponding switch.

To the left of the vertical dot-dash line in FIG. 3B are shown the circuit details of storage unit 1–2GR which are necessary for an understanding of my invention. As previously mentioned, this storage unit establishes a phantom location in the system to store information for the control of group retarder 1–2. Various items of information may be stored in this unit, some of which are shown in the general system illustrated in FIGS. 2A, B. The route storage, of course, is included in this storage bank to coordinate the various items of information and also to provide a means of selecting the particular track characteristics and the track fullness factor for the storage track to which the associated cut of cars is destined. These two factors are not illustrated in the general system of FIGS. 2A, B as they do not enter ino an undersanding of my invention.

The transfer relay for bank B of unit 1–2GR, relay 1–2GRBT, is energized at the same time as relay 1–2BT in unit 1–2 which was previously described. The energizing circuit for relay 1–2GRBT branches from wire 13 over back contact *b* of relay 1–2GRBD and through the winding of relay 1–2GRBT to terminal N. Thus, when a cut of cars occupies detector section 1–4T causing the release of the associated track relay 1–4TR, the closing of back contact *a* of this track relay completes the energizing circuit for the transfer relays in the B banks of both of the units 1–2 and 1–2GR, providing that the other conditions are proper. The stick circuit for relay 1–2GRBT is similar to the stick circuit for relay 1–2BT, including front contact *d* of relay 1–4AD, wire 14, and front contact *a* and the winding of relay 1–2GRBT. Each of the transfer relays thus remains energized until the transfer of the storages is complete, as indicated by the release of relay 1–4AD. The closing of front contact *b* of relay 1–2GRBD completes the energizing circuit for relay 1–2GRBD, this circuit also including back contacts *b*, in multiple, of relays 1–2GRAT and 1–2GRAD. This circuit, as obvious, is similar to circuits traced for corresponding detector relays in other B banks. The stick circuit for relay 1–2GRBD includes front contact *a* of this relay in place of front contact *b* of relay 1–2GRBT.

The transfer of information storages from bank B into bank A of this unit 1–2GR is independent of the transfer of storages in other units and depends only upon the vacancy of bank A. In other words, as soon as bank A of unit 1–2GR is empty, that is, the preceding storage has been cancelled out, a following information storage may transfer into this bank. Bank A of this unit differs slightly from the A banks of other units by having a detector repeater relay 1–2GRADP rather than a transfer control relay TC, although their functions are somewhat similar. The control and utility of this repeater relay will appear shortly.

After the clearing of a prior information storage from bank A which is accompanied by the release of relay 1–2GRAD, the circuit is completed for energizing transfer relay 1–2GRAT to initiate the transfer of a following storage into bank A. Providing a storage is held in bank B at this time, the circuit is completed from terminal B over back contact b of relay 1–2GRBT, front contact c of relay 1–2GRBD, back contact c of relay 1–2GRAD, and the winding of relay 1–2GRAT to terminal N. The closing of front contact a of this latter relay completes a stick circuit for the relay which bypasses back contact c of relay 1–2GRAD in the energizing circuit. These circuits are similar to those already described for the corresponding relay in other A banks. The closing of front contact c of relay 1–2GRAT completes an energizing circuit for relay 1–2GRAD, this circuit also including the winding of this relay and back contact b of its repeater relay 1–2GRADP. Thus energized, relay 1–2GRAD picks up, closing its own front contact a to complete a stick circuit including also the relay winding and the aforementioned back contact b of relay 1–2GRADP. The information stored in bank B at this time may transfer into bank A and will be held in this bank by the detector relay.

As a cut of cars approaches group retarder 1–2, it eventually occupies track section 4CLT shunting the corresponding track relay 4CLTR which then releases to close its back contacts. This completes a circuit for energizing relay 1–2GRADP which includes front contact d of relay 1–2GRAD and back contact b of relay 4CLTR. Once energized, relay 1–2GRADP is held energized by a stick circuit which includes front contact d of relay 1–2GRAD and front contact a and the winding of relay 1–2GRADP. When relay 4CLTR closes its back contact c, a second stick circuit for relay 1–2GRAD is established over this back contact c, also including front contact a and the winding of relay 1–2GRAD. Thus, the opening of back contact b of relay 1–2GRADP, while interrupting the first stick circuit for the storage detector relay, does not cause the deenergization and release of relay 1–2GRAD so that the information storage in bank A is held at this time.

When the rear of the corresponding cut of cars clears track section 4CLT so that track relay 4CLTR is again energized and picks up, the opening of back contact c of this track relay interrupts the existing stick circuit for relay 1–2GRAD and this latter relay eventually releases, thus cancelling the information storage from bank A. Because of the slow release characteristics of relay 1–2GRAD, this release of the information storage is delayed this slow release period after the reenergization of track relay 4CLTR. When relay 1–2GRAD eventually releases, the opening of its front contact d deenergizes its repeater relay 1–2GRADP by interrupting its stick circuit. However, relay 1–2GRADP also is provided with slow release characteristics so that the relay, although deenergized, does not release its armature until the termination of this slow release period. Although the closing of back contact c of relay 1–2GRAD may complete the circuit for relay 1–2GRAT, the transfer of a following group of information storages from bank B into bank A cannot take place until the closing of back contact b of relay 1–2GRADP to complete the energizing circuit for storage detector relay 1–2GRAD, since the multiple connection over back contact c of relay 4CLTR is already open. Thus, the transfer of a new set of information storages into bank A is delayed, after the clearing of track section 4CLT by the rear of a preceding cut of cars, for a timing period equal to the sum of the slow release periods of relay 1–2GRAD and its repeater 1–2GRADP. This assures that the necessary retarder control action for the preceding cut of cars may be accomplished before the various factors are entered into the speed selection computer shown in FIG. 2B to calculate the desired leaving speed for a following cut of cars.

I shall now describe the transfer and storage of the correct leaving velocity and end-of-cut functions CLV and CLVEC, respectively. At the left of FIG. 3A are shown relays CLVEC and CLV, which are the same relays also shown in FIG. 2A. Since the controls are shown in detail and have been previously described in discussing the general system of FIG. 2A, B, the control circuits for these relays are not repeated in FIG. 3A. In the various storage units shown in FIGS. 3A and 3B, where these functions are registered and stored, similar relays are provided for the storage of these two functions. The correct leaving velocity function is registered and/or stored in relays designated by the common reference CLV with a numerical prefix corresponding to the storage unit number and a letter prefix corresponding to the storage bank designation. The end-of-cut function is registered and stored in relays having a common designation EC with the numerical and letter prefixes the same as for the CLV relays. Thus, in bank B of unit 1–4, the relays 1–4BEC and 1–4BCLV are provided for the end-of-cut and the correct leaving velocity function storages, respectively. The designations of the similar storage relays in bank A of unit 1–4 and in both banks of unit 1–2GR are now obvious. There are, of course, no CLV or EC relays in unit 1–2 since these functions have no utility at the final switch location.

I shall first describe the registry of the CLV function into bank B of unit 1–4, assuming that relay CLV is energized and picked up to indicate that the correct leaving velocity out of the master retarder is attained for a particular cut of cars. When the route storage for that cut of cars is transferred forward into unit 1–4, a circuit is completed for energizing relay 1–4BCLV which extends from terminal B over front contact a of relay CLV, back contact b of relay 1–4BEC, the winding of relay 1–4BCLV, and front contact d of relay 1–4BD to terminal N. It is to be remembered that relay CLV can be energized only when section 1–8T is occupied so that relay 1–8TR has released to close its back contact a (FIG. 2A). The closing of back contacts of relay 1–8TR also initiates the transfer of the route storage from unit 1–8, bank A, into bank B of unit 1–4. Thus relay 1–4BD will be energized and picked up shortly after the circuit for relay CLV is completed at back contact a of track relay 1–8TR. If the storages for a preceding cut are still held in bank B, unit 1–4, relay 1–4BEC is also energized and its open back contact b interrupts the energizing circuit for relay 1–4BCLV, thus preventing a following cut from influencing the stored functions for a preceding cut.

It is assumed that this particular cut is of short length, that is, possibly of a single car length only. Relay CLVEC will thus pick up shortly after the initial occupancy of section 1–8T, the circuits having been previously described and shown in FIG. 2A. When this occurs, the circuit for energizing relay 1–4BEC is completed over front contact b of relay CLVEC, back contact a and the winding of relay 1–4BEC, and front contact d of relay 1–4BD. Transfer contact a of relay 1–4BEC is of the continuity type so that the energization of the relay is not interrupted when this transfer contact is picked up to close the corresponding front contact. The stick circuit for relay 1–4BEC is thus completed at this time over its own front contact a and also includes front contact d of relay 1–4BD. If relay 1–4BCLV was previously picked up, the closing of front contact b of relay 1–4BEC completes the stick circuit for relay 1–4BCLV which includes also front contact a of this latter relay and front contact d of relay 1–4BD. Again, transfer contact b of relay 1–4BEC is of the continuity type so that the energization of relay 1–4BCLV is not interrupted during this operation. When relay CLVEC picks up followed by the energization and pick up of relay 1–4BEC, the correct leaving velocity function is locked at its instantaneous condition at that time by the opening of back contact b of relay 1–4BEC. In other words, the control of relay 1–4BCLV by relay CLV is interrupted at this moment so that relay 1–4BCLV remains in whichever condition it then occupies, that is, picked up or released. It is to be noted at this time that the front contacts of relays CLVEC and CLV shown associated with the relay winding at the left of FIG. 3A are the plurality of front contacts which are represented for each relay by the single front contact x in FIG. 2A, as previously mentioned.

For purposes of the specific description, it will now be assumed that the end-of-cut occurs with the corresponding information storage in bank B of unit 1–4 so that relay 1–4BEC picks up as has just been described. It will also be assumed that relay 1–4BCLV was previously energized and is now held up by the end-of-cut registration. When the transfer of the various storages into bank A of unit 1–4 occurs, relays 1–4AT and 1–4AD will pick up in the manner previously described. Circuits are then completed for the energization of relays 1–4AEC and 1–4ACLV. The circuit for the former relay traces from terminal B at front contact e of relay 1–4AT over front contact c of relay 1–4BEC, back contact a and the winding of relay 1–4AEC, and front contact f of relay 1–4AD to terminal N. The closing of front contact a of relay 1–4AEC completes a stick circuit for this relay, the continuity type transfer contact a preventing the deenergization of the relay winding during this operation. At the same time, the circiut for relay 1–4ACLV is completed over front contact e of relay 1–4AT, front contact b of relay 1–4BCLV, back contact a of relay 1–4ACLV, front contact b of relay 1–4AEC, the winding of relay 1–4ACLV, and front contact f of relay 1–4AD. The closing of front contact a of relay 1–4ACLV completes a stick circuit for this relay, again the continuity type transfer contact a preventing the deenergization of the relay winding during the action. At this time, therefore, the end-of-cut and correct leaving speed functions are stored in bank A of unit 1–4 along with the storage of such other information factors as may be used in the general system which for purposes of simplicity are not here shown. The release of relay 1–4BD at the completion of the transfer action cancels the function storages in bank B by interrupting the stick circuits at its front contact d.

As the various transfer actions occur into following storage banks, that is, into bank B and then into bank A of unit 1–2GR, the EC and CLV functions are likewise transferred to the corresponding relays in the subsequent banks and are cancelled from the preceding banks as the transfers complete. For example, the circuit for relay 1–2BEC may be traced from terminal B over front contact c of relay 1–2GRBT, wire 15, front contact c of relay 1–4AEC, wire 16, back contact a and the winding of relay 1–2BEC, and front contact d of relay 1–2GRBD to terminal N. At the same time, a circuit for relay 1–2BCLV includes front contact c of relay 1–2GRBT, wire 15, front contact b of relay 1–4ACLV, wire 17, back contact a of relay 1–2BCLV, front contact b of relay 1–2BEC, the winding of relay 1–2BCLV, and front contact d of relay 1–2GRBD. Relays 1–2BEC and 1–2BCLV each complete a stick circuit by closing the corresponding front contact a, the transfer contact in each case being of the continuity type to prevent any momentary deenergization of the relay winding.

Similarly, the circuit for relay 1–2AEC will be completed at the appropriate time over front contact d of relay 1–2GRAT, front contact c of relay 1–2BEC, back contact a and the winding of relay 1–2AEC, and front contact e of relay 1–2GRAD. The similar circuit for relay 1–2ACLV includes, in addition to back contact a and the winding of this relay, front contact d of relay 1–2GRAT, front contact b of relay 1–2BCLV, front contact b of relay 1–2AEC, and front contact e of relay 1–2GRAD. Again, the closing of its own front contact a completes a stick circuit for each of the relays 1–2AEC and 1–2ACLV. Upon the completion of these various transfer actions, the end-of-cut and correct leaving velocity functions are thus stored in the appropriate condition in bank A of unit 1–2GR. It was previously mentioned that there is no transfer of these functions into the banks of unit 1–2 as such storage can serve no useful purpose in the system.

I shall now assume that the cut of cars is of greater length, that is, comprises two or more cars. Under these conditions, the corresponding route storage, transferred from unit 1–8, bank A, into bank B of unit 1–4 when track section 1–8T is initially occupied, will further transfer into bank A of unit 1–4 prior to the time that the end of this longer cut clears track section 1–8AT to register an end-of-cut indication in relay CLVEC. During this time, relay CLV may pick up and release several times depending on the action of master retarder 1–8 in controlling the speed of this cut of cars. With relay CLVEC and thus the various EC relays in the storage banks released at this time, the operation of relay CLV controls the circuits which energize in turn relays 1–4BCLV and 1–4ACLV. The energizing circuit for relay 1–4BCLV including front contact a of relay CLV and back contact b of relay 1–4BEC has been previously described. When the other storages are transferred into bank A of unit 1–4, the circuit for relay 1–4BCLV is interrupted at front contact d of relay 1–4BD. However, at the same time a circuit is established over front contact f of relay 1–4AD for relay 1–4ACLV. With relay CLV picked up, this circuit extends from terminal B over front contact b of relay CLV, back contact d of relay 1–4BEC, back contact b of relay 1–4AEC, the winding of relay 1–4ACLV, and front contact f of relay 1–4AD to terminal N. The CLV function is thus registered directly under these conditions in bank A of unit 1–4. A similar circuit will then exist for relay 1–4AEC when the end-of-cut indication is registered. This circuit includes front contact c of relay CLVEC, back contact c of relay 1–4BEC, which checks that there has been no previous end-of-cut rgistration, back contact a and the winding of relay 1–4AEC, and front contact f of relay 1–4AD, which is closed at this time. With relay 1–4ACLV previously picked up to close its front contact a, energization of relay 1–4 AEC completes a stick circuit for itself at its own front contact a and a stick circuit for relay 1–4ACLV at front contact b of the former relay, this latter contact also being of the continuity type previously discussed so that there is no deenergization of relay 1–4ACLV during this operation. With the cut continuously occupying section 1–8T during this period, there can be no other transfer into bank B of unit 1–4 due to relay 1–8TC being held energized. With bank B, unit 1–4, empty, all other circuits of relays 1–4AEC and 1–4ACLV are interrupted. After the end-of-cut registration, the two functions will be transferred at the proper time into the banks of unit 1–2GR, as previously described. Also to be noted at this time are the various branch paths indicated from the front contacts of relays CLVEC and CLV into unit 5–8 by which these functions may be transferred or registered in that unit for cuts of cars routed over switch 1–3SW in its reverse position.

If the cut of cars is of even longer length, the leading wheels of the cut may occupy detector section 1–4T prior to the time that the end of the cut clears section 1–8AT in master retarder 1–8. Under these conditions, the route storage will transfer from bank A of unit 1–4 into bank B of units 1–2 and 1–2GR in parallel. As previously described, under these conditions, relays 1–2BT and 1–2GRBT are energized in parallel and pick up, followed by the energization of relays 1–2BD and 1–2GRBD by circuits within the storage units. Since the end-of-cut indication has not been registered, the CLV function will be registered directly into the appropriate bank in unit 1–2GR. Again, as the cut moves through the master retarder, relay CLV may pick up and release as the speed of the cut matches or varies above and below the selected leaving speed. As this relatively long cut of cars moves through sections 1–8AT and 1–8T, the CLV function is registered directly in sequence in relays 1–4BCLV, 1–4ACLV, and 1–2BCLV. The circuits which exist at appropriate times for relays 1–4BCLV and 1–4ACLV have previously been described. When the other storages transfer forward into unit 1–2GR, a circuit is completed, as appropriate, for relay 1–2BCLV from terminal B over front contact $c$ of relay CLV, back contact $d$ of relay 1–4AEC, wire 18, back contact $b$ of relay 1–2BEC, the winding of relay 1–2BCLV, and front contact $d$ of relay 1–2GRBD to terminal N. This circuit, as obvious, would be interrupted if relay 1–4AEC was picked up to indicate an end-of-cut registry. It should also be noted that a branch path from wire 18 to unit 3–4GR exists which would be completed for a corresponding relay in the B bank of that unit if the transfer had been controlled by contact 12 of switch 1–4SW in its reverse position. If the end-of-cut indication is now registered, the closing of front contacts of relay CLVEC energizes relay 1–2BEC, the circuit including front contact $d$ of relay CLVEC, back contact $c$ of relay 1–4AEC, wire 16, back contact $a$ and the winding of relay 1–2BEC, and front contact $d$ of relay 1–2GRBD. Relay 1–2BEC picks up completing its own stick circuit in the manner similar to that already described over its own front contact $a$. Also, the CLV function is locked in relay 1–2BCLV by the completion of the stick circuit for this latter relay over front contact $b$ of relay 1–2BEC. The end-of-cut and correct leaving velocity functions then transfer into bank A of unit 1–2GR in the usual manner at the appropriate time.

If the transfer of the various storages into bank A of unit 1–2GR occurs prior to the registry of the end-of-cut indication for that particular cut of cars, the CLV function will register directly into bank A. The circuit for relay 1–2ACLV, under these conditions, is completed from terminal B over front contact $d$ of relay CLV, wire 19, back contact $d$ of relay 1–2BEC, back contact $b$ of relay 1–2AEC, the winding of relay 1–2ACLV, and front contact $e$ of relay 1–2GRAD to terminal N. Under these conditions, the eventual registration of the end-of-cut function in relay CLVEC will cause a similar registration directly into bank A of unit 1–2GR, the circuit for relay 1–2AEC including, in addition to the relay winding and its own back contact $a$, front contact $e$ of relay CLVEC, wire 20, back contact $c$ of relay 1–2BEC, and front contact $e$ of relay 1–2GRAD. When relay 1–2AEC picks up, it completes a stick circuit at its own front contact $a$ and locks the CLV function into relay 1–2ACLV by completing a stick circuit for this latter relay over front contact $b$ of relay 1–2AEC. Since the two functions are already registered directly into bank A of unit 1–2GR, there is no necessity for any subsequent transfer of the functions into other storage banks. From the preceding description it is apparent that the correct leaving velocity function as registered in the various storage banks may be modified for longer cuts of cars until the time that the end-of-cut indication for that particular cut of cars is registered, regardless of how far forward the corresponding storages have been transferred.

The final operation in the transfer of the CLV function forward in accordance with the progress of the corresponding cut of cars is to read out the condition of this function into the function repeater relay CLVP, which is used as previously described to select between a calculated value and an average value of the $R_c$ factor. The energizing circuit for relay CLVP includes front contact $b$ of relay 1–2ACLV, back contact $a$ of relay 4CLTR, back contact $a$ of relay RTA, and the winding of relay CLVP, part of which circuit was also described in connection with the discussion and description of the general system shown in FIGS. 2A, B. It is thus apparent that relay CLVP may be energized only when the last cut length track section 4CLT is occupied by a car approaching the group retarder and if a measurable cut length is present, as will be indicated by the release of relay RTA in the manner previously described. Thus, even if relay 1–2ACLV is picked up, an extra long cut of cars will prevent the operation of relay CLVP since relay RTA will remain energized.

In summary, it has been shown that the correct leaving velocity (speed) and the end-of-cut functions for a particular cut of cars are transferred forward at the proper times in coordination and in synchronization with the corresponding route storage and other such information storages. It has also been shown that modification is possible for longer cuts of cars for the correct leaving velocity function even though the other storages have transferred into succeeding banks as far as the final or A bank of the storage unit associated with the group retarder through which the particular cut of cars will pass. This makes possible a better control of the speed of that particular cut of cars out of the group retarder since an average value of the $R_c$ factor may be substituted for the calculated value of this factor in the event that the selected correct leaving speed out of the master retarder was not attained, so that proper computations cannot be made by the curved track rolling resistance computer.

Although I have herein shown and described but one form of information transfer circuit arrangement embodying my invention, it is to be understood that various modifications and changes may be made therein within the scope of the appended claims without departing from the spirit and scope of my invention.

Having thus described my invention, what I claim is:

1. In control apparatus for a classification yard having a master retarder and a plurality of group retarders interconnected by at least one track switch, automatic switching means for transferring information along a predetermined route for each cut of one or more cars from the master retarder through one of said group retarders, means for measuring the speed of each cut in the master retarder, means adjustable in accordance with a desired speed, speed check registration means controlled by said speed measuring means and said adjustable means and actuated to a first or a second condition according as the actual speed of a cut in the master retarder is the same as or different from the desired speed, respectively, leaving detector means actuated from a first condition to a second condition as each cut leaves the master retarder, first and second group registration means associated with each group retarder, each operable to a first or a second condition, means controlled by said automatic switching means and said leaving detector means for operating said first group registration means to its first or its second condition according as said leaving detector means is in its first or second condition, respectively, and means controlled by said automatic switching means, said first group registration means in its first condition and said speed check registration means for operating said second group registration means to its first or its second condition, respectively, according as said speed check registration means is in its first or its second condition as each cut leaves the master retarder.

2. The apparatus of claim 1, further comprising, for each group retarder, speed control means for controlling the group retarder to release each cut pasing therethrough at a speed selected in accordance with an applied rolling resistance signal, means for measuring the speed of each cut approaching the group retarder, computing means controlled by said speed measuring means and said second group registration means in its first condition for applying a computed rolling resistance signal for each cut to said speed control means, and means controlled by said second group registration means in its second condition for applying a predetermined average rolling resistance signal to said speed control means.

3. The apparatus of claim 1, further comprising, for each group retarder, speed measuring means located adjacent the group retarder for measuring the speed of each cut approaching it, computing means controlled by said speed measuring means for producing a signal for each cut in accordance with its rolling resistance computed in dependence on the measured speed, speed computing means for computing a leaving speed for each cut in dependence on an applied rolling resistance signal, means controlled by said second group registration means in its first condition for supplying said computed rolling resistance signal to said speed computing means, means controlled by said second group registration means in its second condition for supplying a signal corresponding to a predetermined average value of rolling resistance to said speed computing means, and means controlled by said speed computing means for actuating the group retarder to release each cut at its computed leaving speed.

References Cited in the file of this patent

FOREIGN PATENTS

| | | |
|---|---|---|
| 208,415 | Australia | May 30, 1957 |
| 601,508 | Germany | Aug. 20, 1934 |
| 746,735 | Great Britain | Mar. 21, 1956 |